United States Patent [19]
Barenyi et al.

[11] 3,794,376
[45] Feb. 26, 1974

[54] MOTOR VEHICLE, ESPECIALLY PASSENGER MOTOR VEHICLE

[76] Inventors: Bela Barenyi, Silcherstr. 25, Maichingen; Heinrich Haselmann, Brunnenweisenstr. 17, Sindelfingen, both of Germany

[22] Filed: Oct. 20, 1971

[21] Appl. No.: 190,828

[30] Foreign Application Priority Data
Oct. 20, 1970 Germany.................. P 20 51 373.9

[52] U.S. Cl............................................. 296/137 R
[51] Int. Cl............................................. B62d 25/06
[58] Field of Search.............. 296/137 R, 28 R, 28 F

[56] References Cited
UNITED STATES PATENTS
3,169,793 2/1965 Barenyi et al.................. 296/137 R
3,647,258 3/1972 Porsche et al.................. 296/137 R FOREIGN PATENTS OR APPLICATIONS
1,154,360 9/1963 Germany......................... 296/137 R
1,278,557 2/1961 France............................ 296/137 R
1,314,519 11/1961 France............................ 296/137 R Primary Examiner—Kenneth H. Betts
Assistant Examiner—David M. Mitchell
Attorney, Agent, or Firm—Craig and Antonelli

[57] ABSTRACT

A motor vehicle, particularly a passenger motor vehicle, with a roof surface offset in the vehicle longitudinal direction, which is composed of at least two sheet metal panels connected with each other at their respective ends; these ends are also provided with transversely extending bent portions, offsets, shoulders or the like so that a transversely extending bearer is formed thereby.

28 Claims, 4 Drawing Figures

PATENTED FEB 26 1974  3,794,376

MOTOR VEHICLE, ESPECIALLY PASSENGER MOTOR VEHICLE

The present invention relates to a motor vehicle, especially to a passenger motor vehicle, with a roof surface stepped off in the vehicle longitudinal direction which is composed of at least two roof sheet metal members.

In order to protect the vehicle passengers against injuries in case of an accident, it is necessary to aim at fitting out the vehicle passenger space as form-rigid as possible whereas other structural groups or structural parts are to dissipate the energy present during the aaccident. In order to attain a form-rigid vehicle passenger space, particular attention has to be paid to the construction of the motor vehicle roof in order that the roof is not pushed in when the vehicle rolls over or the like, as occurs easily with the customarily used convex motor vehicle roofs.

Provision must therefore be made that the motor vehicle roof itself has a high form-rigidity. This increase in form-rigidity, which takes place in motor vehicles of the aforementioned type, however, must not lead to a construction such that the interior space of the motor vehicle is reduced or restricted by projecting parts such as, for example, a roll-over girder or yoke, which then may again be the cause for injuries of the vehicle passengers.

The present invention is concerned with the task to further increase the safety in a motor vehicle of the aforementioned type in that the motor vehicle roof is further reinforced and stiffened. The present invention essentially consists in that the ends of the roof sheet metal members connected with each other are provided with transversely extending angular bends, offset or the like which form a transversely extending hollow bearer. This hollow bearer entails the advantageous effect of a roll-over girder without, however, reducing or restricting the vehicle passenger space. Quite to the contrary, by such a hollow bearer, the sharp transition between the roof sheet metal panels which would otherwise exist can be lessened by a flat curvature.

In order to obtain as large as possible a hollow bearer, it is appropriate if the ends of the roof sheet metal members are pressed out or stamped out beyond the roof contour in the upward and/or downward direction. With the loads normally occurring during an accident, it is appropriate if the hollow bearer is located in the rear third of the roof surface.

It is structurally advantageous if the rear roof panel is disposed lower then the forward roof panel. The forward roof panel may thereby be constructed concave in cross section. Additionally, the rear roof panel may be convexly curved in cross section.

According to a further embodiment of the resent invention, the hollow bearer is provided with indentations and/or bores for the accommodation of auxiliary installations. Auxiliary installations such as reading lights, air vents, storage nets or the like can be mounted recessed at the roof panels, i.e., at the hollow bearer, in a simple manner so that they cannot lead to any injury danger for the vehicle passengers.

Accordingly, it is an object of the present invention to provide a motor vehicle, especially a passenger motor vehicle which avoids by simply means the aforementioned shortcomings and drawbacks of the prior art constructions.

Another object of the present invention resides in a motor vehicle which is equipped with a roof that far-reachingly protects the passengers of the vehicle against injuries in case of accidents.

A further object of the present invention resides in a multi-partite motor vehicle roof which offers excellent form-rigidity, yet is devoid of parts projecting into the passenger space and does not effectively reduce the useful space on the inside of the vehicle passenger space.

These and further objects, features, and advantages of the present invention will become more apparent from the following description when taken in connection with the accompanying drawing which shows, for purposes of illustration only, several embodiments in accordance with the present invention, and wherein.

Figure 1:
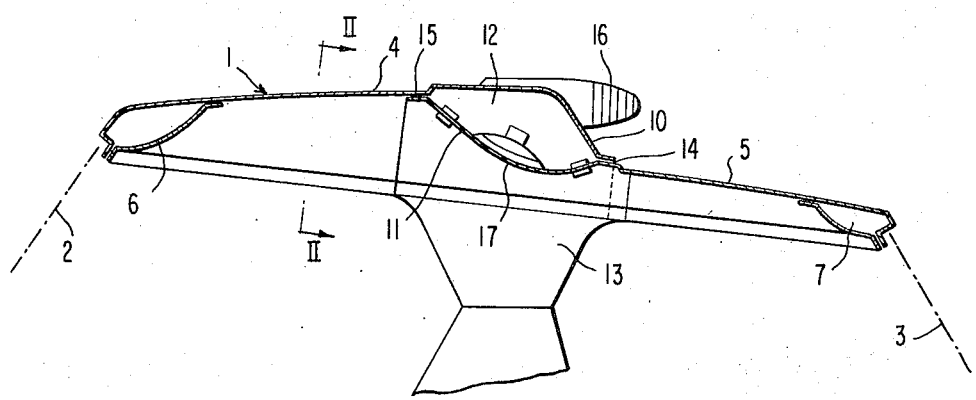
FIG. 1 is a cross-sectional view in the vehicle longitudinal direction through a motor vehicle roof in accordance with the present invention.

Referring now to the drawing wherein like refrence numerals are used throughout the various views to designate like parts, the motor vehicle roof generally designated by reference numeral 1 and illustrated in FIG. 1 in longitudinal cross section extends between the windshield 2 and the rear window 3. The motor vehicle roof 1 consists of two roof panels 4 and 5 made from sheet metal which are bent downwardly within the area of the windshield 2 and of the rear window 3 and which together with additional sheet metal strips 6 and 7 form hollow front and rear bearers extending parallel to the windshield 2 and the rear window 3. The sheet metal strips 6 and 7 are connected with the roof panels 4 and 5 by spot welding or the like.

Figure 2:
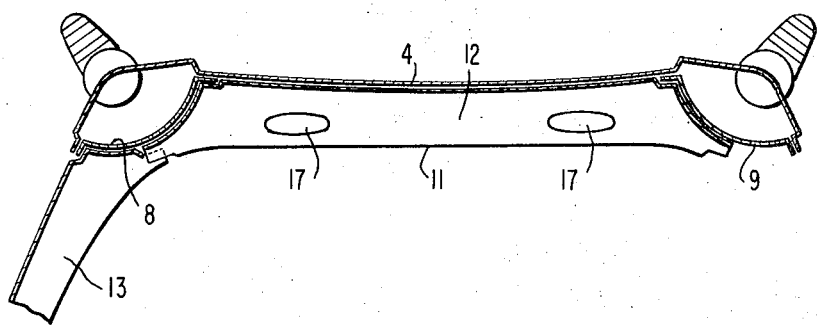
FIG. 2 is a cross-sectional view of the motor vehicle roof of FIG. 1 taken along line II—II of FIG. 1.

As can be seen from FIG. 2, the roof members 4 and 5 are also angularly bent down at the sides and form together with further sheet metal strips 8 and 9, also connected thereto by spot-welding, lateral hollow bearers extending in the vehicle longitudinal direction. The rear roof panel 5 is convexly curved upwards in its cross section and is disposed lower than the forward roof panel 4 concavely curved downwards in cross section. The mutually facing ends 10 and 11 of the roof members 4 and 5 are angularly bent down and up, respectively, to the height of the corresponding other roof members 5 and 4. These ends 10 and 11 overlap one another a certain distance and form thereby a transversely disposed hollow bearer 12. A column 13 (FIG. 2) also constructed as hollow bearer and disposed in the side wall of the passenger motor vehicle adjoins this hollow bearer 12 on each side. The ends 10 and 11 terminate in end flanges 14 and 15 disposed parallel to the surfaces of the roof panels 5 and 4, by means of which they are secured at the roof panel 5 and at the roof panel 4, respectively, by spot welding. The ends 10 and 11 of the roof panels 4 and 5 which can be considered as flange or web surfaces are provided with indentations or bores in which are mounted on the out-side positioning lamps 16 or 17 or the like pointing toward the rear and on the inside reading lamps 17 or air showers or the like which are directed forwardly. In order to create a hollow bearer 12 with as high as possible a cross-sectional height, the ends 10 and 11 are pressed out in the upward and downward directions slightly beyond the contour of the roof panels 4 and 5.

Figure 3:
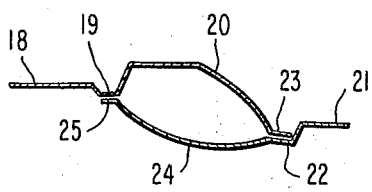
FIG. 3 is a somewhat schematic, partial cross-sectional view through a further embodiment of a motor vehicle roof in accordance with the present invention.
Figure 4:
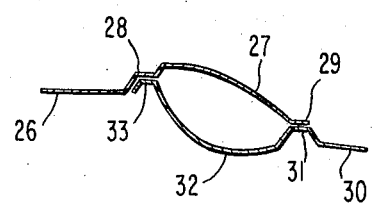
FIG. 4 is a somewhat schematic partial cross-sectional view through a still further modified embodiment of a motor vehicle roof in accordance with the present invention, similar to FIG. 3.

This pressing out beyond the contour of the roof surface is carried out to an increased extent in the embodiments according to FIGS. 3 and 4. In the embodiment of FIG. 3, a downwardly pressed-out groove 19 adjoins the forward roof panel 18, which is followed by the end 20 that it upwardly pressed out and then angularly bent in the downward direction. The rear roof panel 21 which is located lower than the roof panel 18 is provided at first with a lower offset or shoulder 22 for the accommodation of the angularly bent end flange 23 of the end 20, which is adjoined by the downwardly curved end 24 that terminates in an end flange 25 disposed opposite the groove 19 of the roof panel 18.

In the embodiment according to FIG. 4, the downwardly curved end 27, pressed out upwards beyond the front roof panel 26 adjoins the forward roof panel 26 by way of an offset or shoulder 28 and terminates in a flange 29. The downwardly curved or pressed-out end 32 adjoins the rear lower roof panel 30 by way of an upwardly directed offset or shoulder 31, which terminates in a flange 33. The connection of the offsets 28 and 31 with the flanges 33 and 29 takes place by spot welding as customary. However, instead of spot welding, also a bonding, gluing, riveting or the like can be used. Furthermore, the roof members 4 and 5 need not be made from sheet metal but also from any other material suitable therefor, e.g., from synthetic resinous material.

While we have shown and described several embodiments in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A motor vehicle, especially passenger motor vehicle, with a roof surface offset in the vehicle longitudinal direction that is formed by at least two roof panel means, portions of which form the exterior surface of a roof of the motor vehicle characterized in that the ends of the roof panel means connected with each other are provided with overlapping transversely extending portions to form a transversely extending hollow bearer when assembled together.

2. A motor vehicle according to claim 1, characterized in that said transversely extending portions comprise angular bent portions of the roof panel means, as viewed in longitudinal cross section.

3. A motor vehicle according to claim 1, characterized in that the transversely extending portions comprise offset in the roof panel means, as viewed in longitudinal cross section.

4. A motor vehicle according to claim 1, characterized in that the mutually facing ends of the roof panel means are bent beyond the roof panel contours in at least one of the upward and downward directions.

5. A motor vehicle according to claim 4, characterized in that each of the mutually facing ends of the roof panel means are bent in both the upward and downward directions beyond the roof panel contours.

6. A motor vehicle according to claim 4, characterized in that the hollow bearer is located within the rear third of the roof surface.

7. A motor vehicle according to claim 6, characterized in that the at least two roof panel means includes a rear roof panel means and a forward roof panel means and in that the rear roof panel means is disposed lower than the forward roof panel means.

8. A motor vehicle according to claim 7, characterized in that the forward roof panel means is concave, as viewed in transverse cross section.

9. A motor vehicle according to claim 8, characterized in that the rear roof panel means is a convex, as viewed in transverse cross section.

10. A motor vehicle according to claim 9, characterized in that the hollow bearer is provided with indentations for the accommodation of auxiliary devices.

11. A motor vehicle according to claim 10, characterized in that the hollow bearer is provided with bores for the accommodation of auxiliary devices.

12. A motor vehicle according to claim 11, characterized in that each of the mutually facing ends of the roof panel means are bent in both the upward and downward directions beyond the roof panel contours.

13. A motor vehicle according to claim 12, characterized in that said transversely extending portions comprise angular bent portions of the roof panel means, as viewed in longitudinal cross section.

14. A motor vehicle according to claim 12, characterized in that the transversely extending portions comprise offsets in the roof panel means, as viewed in longitudinal cross section.

15. A motor vehicle according to claim 1, characterized in that the hollow bearer is located within the rear third of the roof surface.

16. A motor vehicle according to claim 1, characterized in that the at least two roof panel means include rear roof panel means and a forward roof panel means and in that the rear roof panel means is disposed lower than the forward roof panel means.

17. A motor vehicle according to claim 16, characterized in that the forward roof panel means is concave, as viewed in transverse cross section.

18. A motor vehicle according to claim 16, characterized in that the rear roof panel means is convex, as viewed in transverse cross section.

19. A motor vehicle according to claim 1, characterized in that the transversely extending hollow bearer is provided with indentations for the accommodation of auxiliary devices.

20. A motor vehicle according to claim 1, characterized in that the transversely extending hollow bearer is provided with bores for the accommodation of auxiliary devices.

21. A motor vehicle according to claim 1, wherein the lateral outer edges of the at least two roof panel means are angulary bent down and wherein means are provided for forming laterally extending hollow bearers with the lateral edges of the roof panel means.

22. A motor vehicle according to claim 21, wherein said means for forming laterally extending hollow bearers includes sheet metal strips connected to respective lateral edges of the roof panel means.

23. A motor vehicle according to claim 1, wherein the at least two roof panel means include a rear roof panel means and a forward roof panel means and wherein the front end of said forward roof panel means and the rear end of said roof panel means are provided with angularly bent transversely extending portions and means are provided for forming additional transversely extending hollow bearers along said front end and said rear end of said forward and said rear roof panels means:

24. A motor vehicle according to claim 23, wherein said means for forming additional transversely extending hollow bearers includes sheet metal strips connected to respective ends of said forward and said rear roof panel means.

25. A motor vehicle according to claim 21 wherein the at least two roof panel means include a rear roof panel means and a forward roof panel means and wherein the front end of said forward roof panel means and the rear end of said rear roof panel means are provided with angularly bent transversely extending portions and means are provided for forming additional transversely extending hollow bearers along said front end and said rear end of said forward and said rear roof panel means.

26. A motor vehicle according to claim 25 wherein the rear roof panel means is disposed lower than the forward roof panel means.

27. A motor vehicle according to claim 26, wherein the forward roof panel means is concave, as viewed in transverse cross section.

28. A motor vehicle according to claim 27, wherein the rear roof panel means is convex, as viewed in transverse cross section.

* * * * *